US008112495B2

(12) United States Patent
Hazlewood et al.

(10) Patent No.: US 8,112,495 B2
(45) Date of Patent: Feb. 7, 2012

(54) TRANSMITTING INFORMATION ABOUT DISTRIBUTED GROUP MEMBERSHIPS

(75) Inventors: Kristin Marie Hazlewood, Austin, TX (US); Yogesh Vilas Golwalkar, Pune (IN); Gary Dale Williams, Driftwood, TX (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 12/407,038

(22) Filed: Mar. 19, 2009

(65) Prior Publication Data
US 2010/0241688 A1    Sep. 23, 2010

(51) Int. Cl.
G06F 15/16       (2006.01)
G06F 15/173     (2006.01)

(52) U.S. Cl. .................. 709/217; 709/203; 709/225

(58) Field of Classification Search .................. 709/217, 709/202, 203, 219, 220–227, 229, 246; 707/758, 707/781, 783–788
See application file for complete search history.

(56) References Cited

U.S. PATENT DOCUMENTS

| | | | |
|---|---|---|---|
| 6,768,988 B2 | 6/2004 | Boreham et al. | |
| 6,772,214 B1 | 11/2004 | McClain et al. | |
| 7,024,693 B2 | 4/2006 | Byrne | |
| 7,085,834 B2 | 8/2006 | Delaney et al. | |
| 7,206,851 B2* | 4/2007 | Delaney et al. | 709/229 |
| 7,340,447 B2 | 3/2008 | Ghatare | |
| 7,363,339 B2* | 4/2008 | Delany et al. | 709/202 |
| 2005/0216485 A1 | 9/2005 | Bell et al. | |
| 2010/0205193 A1* | 8/2010 | Krishna | 707/758 |

* cited by examiner

*Primary Examiner* — Wing Chan
*Assistant Examiner* — Ruolei Zong
(74) *Attorney, Agent, or Firm* — Garg Law Firm, PLLC; Rakesh Garg; Jeffrey S. LaBaw

(57) ABSTRACT

A method, system, and computer usable program product for transmitting information about dynamic group memberships of an entry stored in a computer memory are provided in the illustrative embodiments. A set of dynamic group filters is received from a server in a distributed data environment. The set of dynamic group filters provides a set of attributes. A determination is made whether the entry includes a subset of the set of attributes. A request for dynamic group memberships of the entry is sent to the server. The request includes the subset of attributes and excludes attributes not used by any of the dynamic group filters. Information about at least one dynamic group of which the entry is a member is received for evaluation. A proxy server may receive the request for dynamic group filters and distribute the request to one or more servers in a distributed data environment.

18 Claims, 9 Drawing Sheets

TRANSMITTING INFORMATION ABOUT DISTRIBUTED GROUP MEMBERSHIPS

BACKGROUND OF THE INVENTION

1. Field of the Invention

The present invention relates generally to an improved data processing system, and in particular, to a computer implemented method for managing distributed data. Still more particularly, the present invention relates to a computer implemented method, system, and computer usable program code for transmitting information about distributed group membership of data entries.

2. Description of the Related Art

Data can be distributed across a number of data servers. A request for certain data can be directed at any combination of those data servers. Generally, a user or a system requesting the data need not know the number, identity, contents, or the methods of accessing the various data servers. A data processing system, commonly called a proxy server, acts as an intermediary between the requesting data processing system and the various servers. The user targets the request for data to the proxy server, the proxy server interacts with the appropriate server in the appropriate manner, and the user receives the requested data from the proxy server.

A directory can be distributed across a number of directory servers in a similar manner. A directory is a hierarchical arrangement of information pertaining to objects, such as users, groups, and systems in an organization. A directory server is a server in a data processing environment that provides a directory service. A directory service is a process by which a user in the data processing environment can retrieve details of an object from a directory server by providing a name of the object.

Directory servers may serve directories that are arranged according to some standard. Standards, such as Lightweight Directory Access Protocol (LDAP), specify ways of accessing the information stored in a directory, the operations allowed on the information in the directory, and how those operations are to be executed with respect to the directory. A directory may be implemented using a standard, a variation of the standard, or by using a proprietary hierarchy. For example, an embodiment of the invention may be implemented using an X.500 directory server, which implements a directory standard of that name. Various embodiments of the invention may also be implemented using a name server, or a user location service server (ULS server).

Information pertaining to an object, such as a user or a system, in a directory is called an entry. Typically, an entry includes a name and a set of attributes. A set of attributes is one or more attributes. An attribute of an entry is a data component of the entry. An attribute may itself have a value, or an attribute may be a data structure that may include a set of tags, each tag having a value. A tag is a data component of an attribute. A set of tags is one or more tags.

An entry in a directory may be a member of a group. For example, an entry in a directory may correspond to user "John Doe." User John Doe may be a member of several user groups. Those user groups may be represented by group entries in other parts of the directory. A group entry is an entry that represents a group and contains information pertaining to that group. John Doe user's entry may be a member of one or more of those group entries.

A group may be a static group or a dynamic group. A static group is a group that specifically includes its members. A static group entry is a group entry that includes some or all of the information from its member entries. A dynamic group is a group that defines its members by certain common characteristics. A dynamic group entry is a group entry that defines one or more criterion for membership. The criterion for membership into a dynamic group entry is called a filter.

SUMMARY OF THE INVENTION

The illustrative embodiments provide a method, system, and computer usable program product for transmitting information about distributed group memberships of an entry stored in a computer memory. A set of dynamic group filters is received from a server in a distributed data environment. The set of dynamic group filters provides a set of attributes. A determination is made whether the entry includes a subset of the set of attributes. A request for dynamic group memberships of the entry is sent to the server. The request includes the subset of attributes. The request excludes attributes not used by any of the dynamic group filters in the set of dynamic group filters. Information about at least one dynamic group of which the entry is a member is received.

In one embodiment, a first request for a set of dynamic group filters is received from a sender. A second request for a subset of the set of dynamic group filters is sent to a server in a distributed data environment. The set of dynamic group filters is received from the server. The set of dynamic group filters is sent to the sender. A third request for dynamic group memberships of the entry is received. The third request includes information about a subset of the set of attributes. One or more dynamic group of which the entry is a member is provided.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
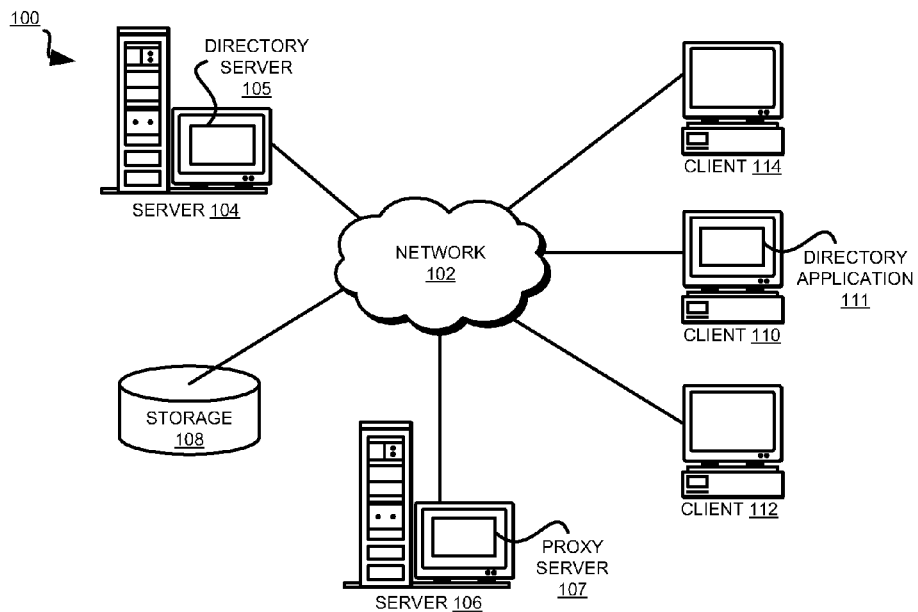
FIG. 1 depicts a pictorial representation of a network of data processing systems in which illustrative embodiments may be implemented.

The invention recognizes that occasionally a particular object's membership has to be evaluated in a distributed data environment. To evaluate a membership is to learn about the membership for performing a task. For example, an application may have to evaluate a data object's membership into a group of data objects to ensure that the data object legitimately belongs in a particular group. A data object is any structured representation of data.

As another example, as in the context of a directory, an application may have to evaluate a user's memberships. The application may perform the evaluation using the user's entry in order to remove some memberships, assign new memberships that may not exist for that user, or perform any one of many conceivable actions relative to the identified memberships. As another example, an application may have to evaluate a user's memberships to determine whether to permit the user access to a certain component of the application.

In a distributed data environment the data may be distributed such that some data servers may serve data objects, other data servers may serve information about groups, and some other data servers may serve a combination thereof. For example, in a distributed directory, a directory server may serve entries pertaining to users, systems, or other objects. Another directory server in the distributed directory may serve group entries. Some directory servers in the distributed directory may serve a combination of the entries, group entries, and other types of data.

Using distributed directories as an example, the invention recognizes evaluating distributed group memberships in such distributed environments can be computing resource intensive. Significant volume of data including entries, attributes, tags, and other information is presently exchanged for performing membership evaluations.

An entry in a directory can be configured to have a set of attributes. An attribute of an entry is a name and value pair representing data that is a part of the entry. A set of attributes is one or more attributes. Furthermore, different entries in a given directory may include different sets of attributes. An attribute may be a data structure that may include a set of tags. A set of tags is one or more tags. A tag is a name and value pair representing a piece of data that is a part of an attribute.

A distinguished name (DN) of an entry is an identifier of the entry that uniquely identifies the entry in the directory. A distinguished name of an entry may be a subset of the attributes, subset of the tags, or a combination thereof, of an entry that uniquely identifies the entry in the directory.

Generally, in order to evaluate an entry's membership in a static group in a directory, sending the DN associated with the entry to the static group directory server is sufficient. The static group directory server matches the DN of the entry into the static group entries and returns those static group entries that include that DN.

The invention recognizes that evaluating an entry's membership in dynamic groups is especially data intensive. Presently, the entire data content of an entry has to be transmitted to a directory server to determine whether the entry is a member of any dynamic group. The data traffic is further exacerbated when the directory is distributed. In a distributed directory, the entire data content of the entry has to be transmitted to several of the directory servers serving the distributed directory for dynamic group membership evaluation.

The invention recognizes that the data traffic for such evaluations is particularly heavy when an entry has voluminous data associated with it. For example, a user's entry may have a picture, graphic, image, video clip, or an audio clip associated with the entry. The invention recognizes that presently, for evaluating the dynamic group membership of such an entry, all such pictures, videos, audios, or other voluminous data of the entry is transmitted to all the dynamic group directory servers.

The invention recognizes that transmitting such volumes of data for evaluating dynamic group memberships is inefficient. Such transmissions cause degraded data network performance, degraded directory performance, and consume significant computing resources.

To address these and other problems associated with evaluating group memberships in distributed environments, various embodiments of the invention, in an illustrative manner, provide a method, computer usable program product, and data processing system for transmitting information about distributed group memberships. Using the illustrative embodiments, the data traffic associated with evaluating dynamic group memberships can be significantly reduced. Using the illustrative embodiments, the performance of directories, and any distributed data environment in general can be improved.

The examples in this disclosure are used only for the clarity of the description and are not limiting on the various embodiments of the invention. Additional operations, actions, tasks, activities, and manipulations will be conceivable from this disclosure and the same are contemplated within the scope of the various embodiments.

The various embodiments of the invention are described using specific code, data structures, designs, layouts, schematics, and tools only as examples and are not limiting on the illustrative embodiments. The illustrative embodiments may be implemented with respect to any type of directory entry having any type of attributes or tags.

Furthermore, the various embodiments of the invention are described in some instances using particular software tools and data processing environments only as an example for the clarity of the description. The illustrative embodiments may be used in conjunction with other comparable or similarly purposed systems, applications, or architectures. For example, although described using a directory as an example environment for clarity, the embodiments are equally applicable for transmitting information about, and evaluating membership of, any type of data object in any type of data environment. For example, the embodiments are equally applicable to evaluating dynamic group membership of a data object in a distributed relational or object oriented database.

Any advantages listed herein are only examples and are not intended to be limiting on the various embodiments of the invention. Additional or different advantages may be realized by specific embodiments. Furthermore, a particular embodiment may have some, all, or none of the advantages listed above.

Figure 2:
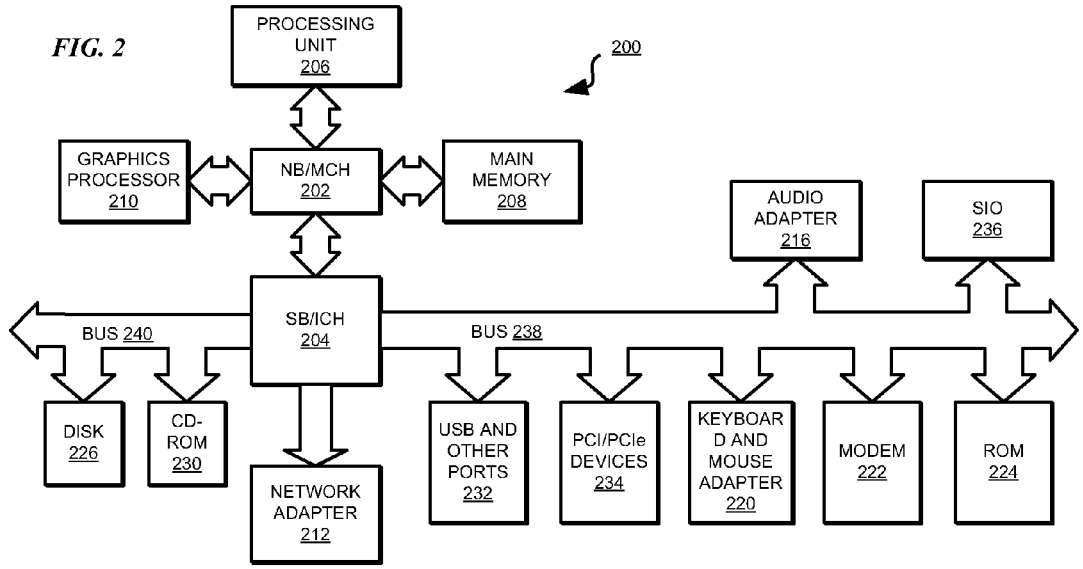
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may have software applications or software tools executing thereon. For example, server 104 may include directory server 105. Server 106 may include proxy server 107 that may interact with directory server 105 and other directory servers (not shown) in data processing environment 100. Client 110 may include directory application 111, which may be another distributed directory server, a directory client, or any other type of application usable in conjunction with a directory.

Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
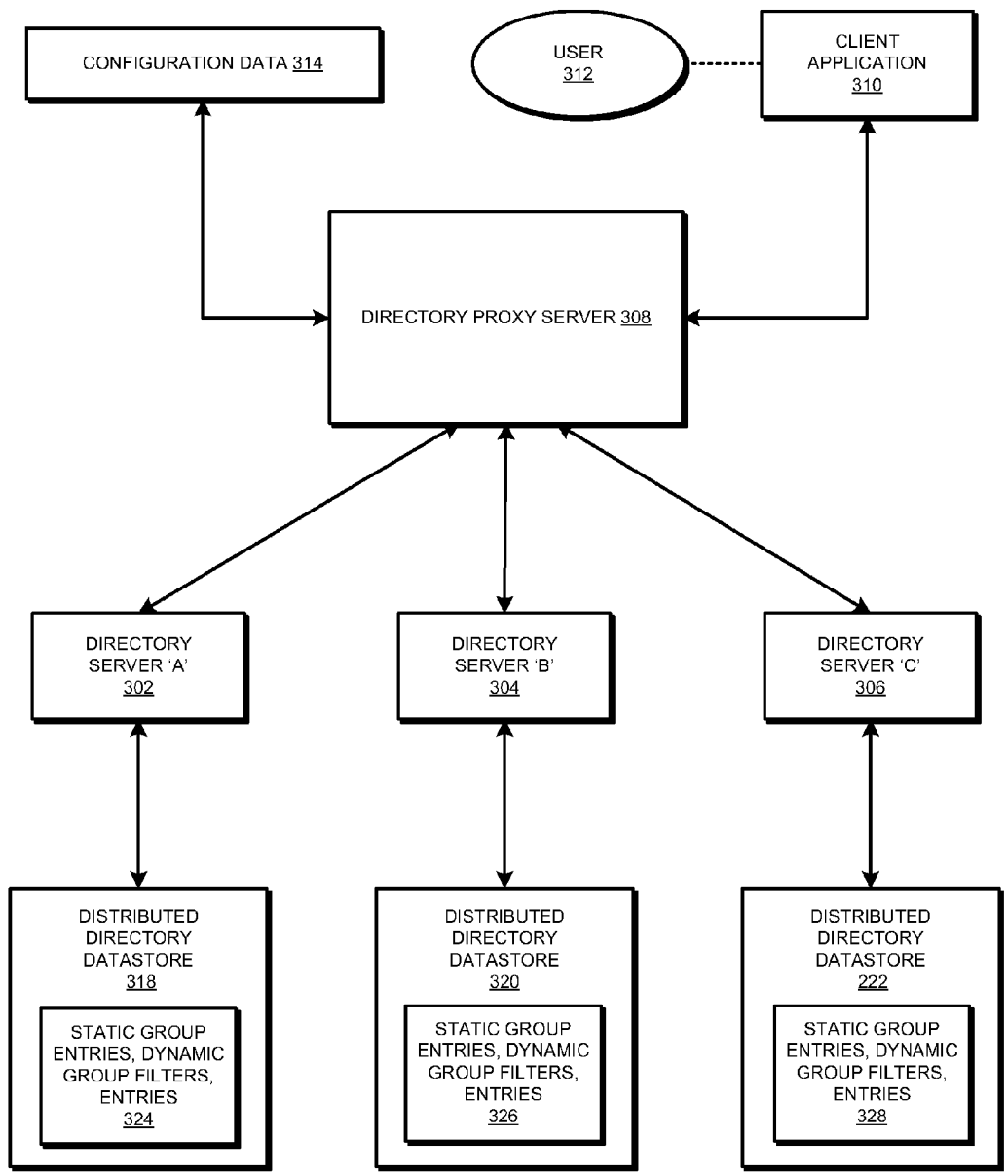
FIG. 3 depicts a block diagram of an example distributed directory in conjunction with which an illustrative embodiment may be used.

With reference to FIG. 3, this figure depicts a block diagram of an example distributed directory in conjunction with which an illustrative embodiment may be used. Any of directory servers 302, 304, or 306 may be implemented using directory server 105 in FIG. 1. Proxy server 308 may be implemented using proxy server 107 in FIG. 1. Client application 310 may be implemented using directory application 111 in FIG. 1. Additionally, any of directory server 302, 304, or 306, proxy server 308, and client application 310 may execute on one or more server data processing system such as server 104 in FIG. 1, one or more client data processing system such as client 112 in FIG. 1, or a combination thereof.

User 312 may use client application 310 to interact with the directory that is collectively served by directory servers 302, 304, and 306. Client application 310 sends a directory request to proxy server 308.

Proxy server 308 may utilize configuration data 314 to determine how and to which directory servers the request should be sent. In one circumstance, proxy server 308 may send the request to all directory servers 302, 304, and 306. In another circumstance, proxy server 308 may send the request to only some directory servers depending on the request, configuration data 314, and other information available to proxy server 308.

A distributed directory server communicates with one or more distributed directory datastore. In the example depiction of this figure, directory server 302 communicates with distributed directory datastore 318, directory server 304 communicates with distributed directory datastore 320, and directory server 306 communicates with distributed directory datastore 322.

A particular distributed directory datastore may include information about any combination of entries, static group entries, and dynamic group filters, among other types of information. For example, distributed directory datastore 318 may include data 324 that may be one combination of entries, static group entries, and dynamic group filters. Distributed directory datastore 320 may include data 326 that may be another combination of entries, static group entries, and dynamic group filters. Distributed directory datastore 322 may include data 328 that may be yet another combination of entries, static group entries, and dynamic group filters.

Some or all of the directory servers 302, 304, and 306 may receive a request. The illustrative embodiments use directory server 302 as an example directory server that receives the request. Using the information provided in the request, directory server 302 may use distributed directory datastore 318, such as by searching data 324, for responding to the request.

Directory server 302, and any other directory server operating in a similar manner, may respond to proxy server 308 with an appropriate response to the request. Proxy server 308 may assimilate, compile, organize, arrange, calculate, or otherwise assemble a response from the various responses received from the various directory servers. Proxy server 308 sends the assembled response to client application 310.

A directory server, such as directory server 302, may request or exchange information with client application 310 in a reverse manner. In one embodiment, client application 310 may itself be a directory server that may communicate with other directory servers, namely directory server 302, 304, and 306, to exchange directory information in the above described manner.

Figure 4:
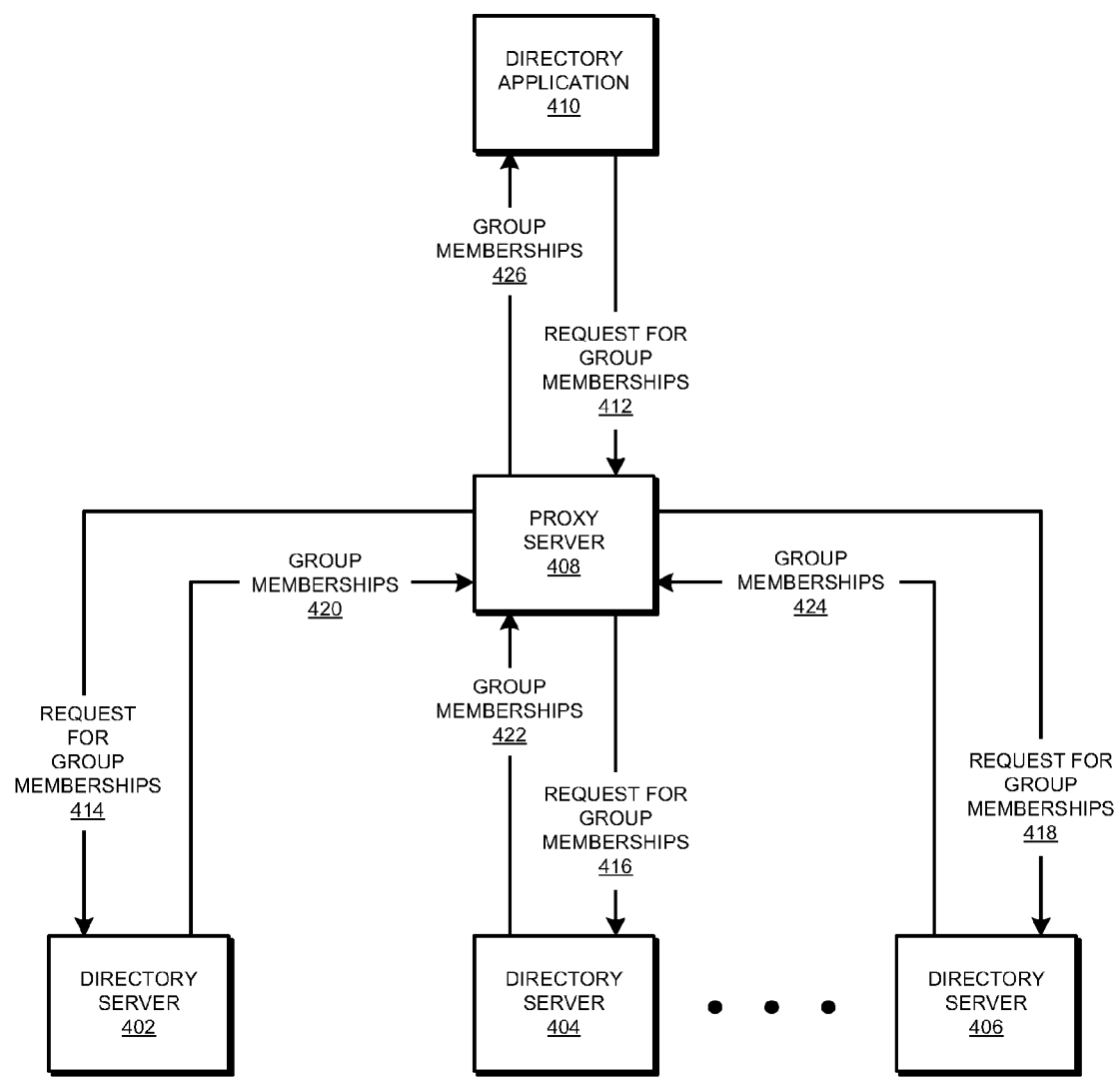
FIG. 4 depicts a block diagram of evaluating distributed group memberships with respect to which an illustrative embodiment can be used.

With reference to FIG. 4, this figure depicts a block diagram of evaluating distributed group memberships with respect to which an illustrative embodiment can be used. Directory servers 402, 404, and 406 may be similar to directory server 302, 304, and 306 respectively in FIG. 3. Proxy server 408 may be similar to proxy server 308 in FIG. 3. In one embodiment, directory application 410 may be similar to client application 310 in FIG. 3. In another embodiment, directory application 410 may be similar to directory server 402.

Directory application 410 may send request 412 for group memberships of an entry in a distributed directory. Proxy server 408 receives request 412 for identifying all the group memberships of the entry.

In an example circumstance, proxy server 408 may send the request to all directory servers 402, 404, and 406. Proxy server 408 may direct a suitably formatted request, such as request 414 for group memberships, to directory server 402. Proxy server 408 may direct a suitably formatted request, such as request 416 for group memberships, to directory server 404. Proxy server 408 may direct a suitably formatted request, such as request 418 for group memberships, to directory server 406.

A distributed directory server communicates with one or more distributed directory datastore having information about any combination of entries, static group entries, and dynamic group filters, among other types of information, in order to formulate a response to the request. Directory server 402 may respond with group memberships 420. Directory server 404 may respond with group memberships 422. Directory server 406 may respond with group memberships 424. Proxy server 408 may assemble group memberships 420, 422, and 424 into group memberships 426 as a response to request 412.

Figure 5:
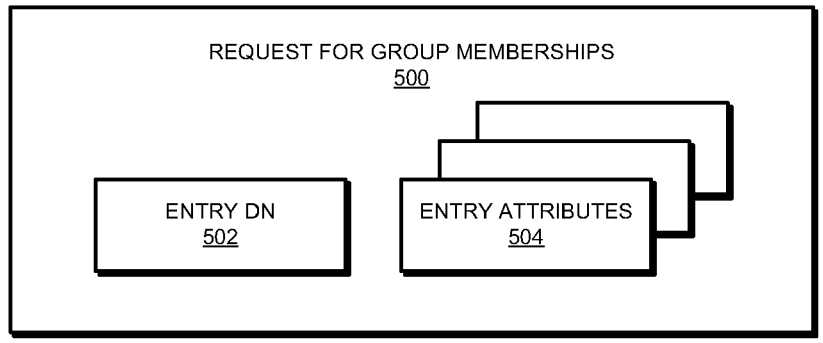
FIG. 5 depicts a block diagram of a request for evaluating group memberships with respect to which an illustrative embodiment may be used.

The various embodiments of the invention recognize that, presently, to accomplish the group membership evaluation described in FIG. 4, each of requests 412, 414, 416, and 418 have to include all the voluminous data that may be a part of the entry whose group memberships are requested. FIG. 5 depicts a present form of such a request.

With reference to FIG. 5, this figure depicts a block diagram of a request for evaluating group memberships with respect to which an illustrative embodiment may be used. Request 500 may be any of requests 414, 414, 416, or 418 in FIG. 4.

Request 500 includes DN 502 of the entry whose static and dynamic group memberships are being evaluated. Request 500 further includes attributes 504, which include all the attributes and tags thereof of the entry in question.

According to the presently available techniques, request 500 has to include all the attributes of the entry because a dynamic group may use any of those attributes or tags to filter on, and determine membership to that dynamic group. For example, one dynamic group called "Bob's team" may include all those users whose manager is "Bob". An attribute of the user entries in a directory may be the name of the manager of the user whom the entry represents.

Without the benefits of an embodiment of the invention, the entire entry has to be sent to a directory server that holds "Bob's team" dynamic group's information. The entire set of attributes and tags has to be sent to the directory server because only at that directory server is the filter for constructing that dynamic group known. For example, if only the DN of the entry is sent, and "manager's name" attribute is not a part of the DN, the directory server will not be able to confirm the entry's membership in "Bob's team" dynamic group and the evaluation of the entry's group memberships will be incomplete.

Thus, without the information about the filters used for determining a dynamic group membership, a request for evaluating group membership has to burden the data network with complete entry information. For example, to confirm the entry's membership in "Bob's team" dynamic group, all the attributes, including, for example, a picture of user, have to be sent over the network. The directory server, in this example does not use users' pictures to determine membership in "Bob's team" dynamic group, but the pictures have to be transmitted nonetheless. The illustrative embodiments provide a process by which only those attributes that are used in the filters are sent over the data network.

Figure 6:
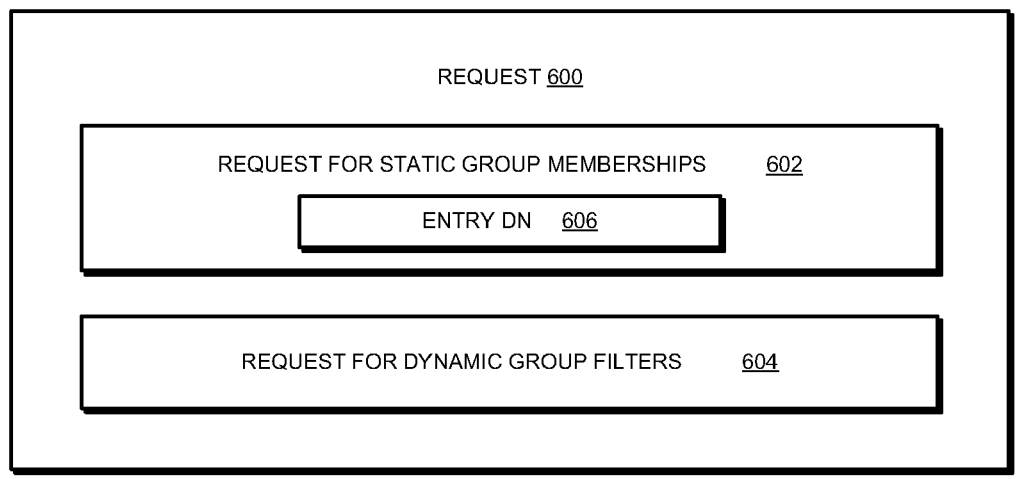
FIG. 6 depicts a block diagram of an example request for evaluating group memberships of an example entry in accordance with an illustrative embodiment.

With reference to FIG. 6, this figure depicts a block diagram of an example request for evaluating group memberships of an example entry in accordance with an illustrative embodiment. Request 600 may be used in place of request 500 in FIG. 5.

In one embodiment, as shown, request 600 may include request 602 for static group memberships and request 604 for dynamic group filters. In another embodiment, request 602 and 604 can be separated as two separate requests within the scope of the various embodiments of the invention.

Request 602 may include DN 606 of the example entry. In one embodiment, request 602 may include any subset of attributes or tags that is known to identify the entry's membership in static groups.

Request 604 may be constructed in any manner suitable for a particular implementation. Request 604 may be a request which asks a directory server to return the construct of one or more filters that directory server uses for forming a dynamic group.

Figure 7:
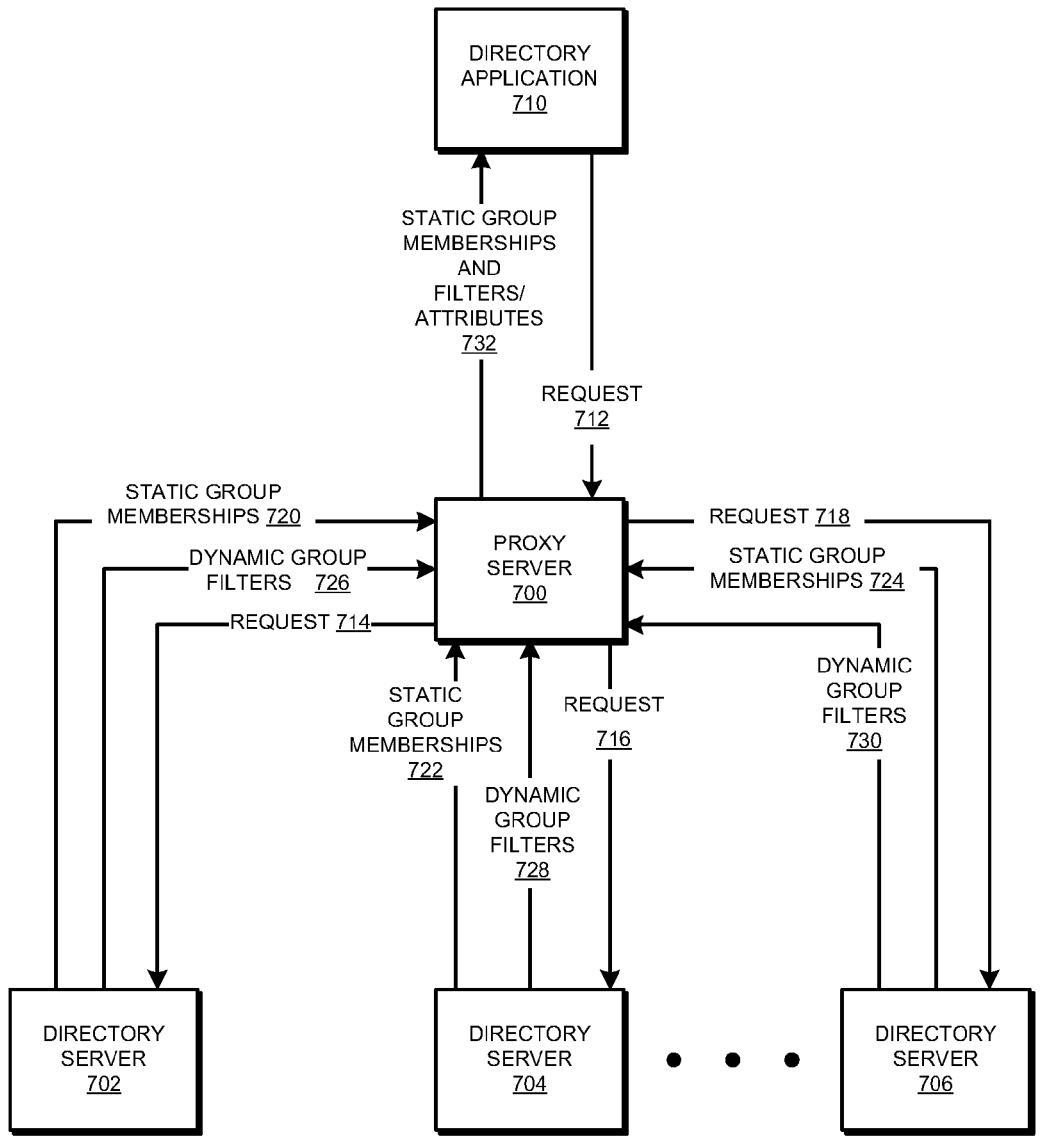
FIG. 7 depicts a block diagram of a modified process of evaluating group memberships in accordance with an illustrative embodiment.

With reference to FIG. 7, this figure depicts a block diagram of a modified process of evaluating group memberships in accordance with an illustrative embodiment. Directory server 702, 704, and 706 may be similar to directory server 402, 404, and 406 respectively in FIG. 4. Proxy server 708 may be similar to proxy server 408 in FIG. 4. Directory application 710 may be similar to directory application 410 in FIG. 4.

Request 712 may be similar to request 600 in FIG. 6. In one embodiment, request 712 may be sent as a single request including a request for static group memberships as well as request for dynamic filters. In another embodiment, request 712 may be separated into two separate requests as described with respect to request 600 in FIG. 6.

Proxy server 708 may direct a suitably formatted request, corresponding to request 712 to one or more directory servers according to a particular implementation. For example, proxy server 708 may direct request 714 to directory server 702, request 716 to directory server 704, and request 718 to directory server 706. Again, any of requests 714, 716, and 718 may be a combined request similar to request 600 in FIG. 6, or two separate requests as described with respect to an alternate embodiment of request 600 in FIG. 6. In one embodiment, proxy server 708 may send combined request to some directory servers and separate requests for static group memberships and dynamic filters to other directory servers.

In response to the request for static group membership portion of requests 714, 716, and 718 respectively, directory servers 702, 704, and 706 may send corresponding responses 720, 722, and 724 to proxy server 708. Each of responses 720, 722, and 724 may include information pertaining to zero or more static groups available at the corresponding directory server, of which the entry of request 712 is a member.

In response to the request for dynamic group filters portion of requests 714, 716, and 718 respectively, directory servers 702, 704, and 706 may send corresponding responses 726, 728, and 730 to proxy server 708. Each of responses 726, 728, and 730 may include information pertaining to zero or more dynamic group filters available at the corresponding directory server.

Using the "Bob's team" example above, and using directory server 702 as an example, directory server 702 may use filter "ManagerName=Bob" for forming the dynamic group "Bob's team". In response to the dynamic group filter request portion of request 714, directory server 702 may respond by returning "ManagerName=Bob" dynamic group filter in response 726. With this knowledge, all the attributes, including, for example, a picture of user, need not be sent over the network. Directory server 702 in this example does not use users' pictures to determine membership in "Bob's team" dynamic group. Therefore, a subsequent request for determining an entry's membership in "Bob's team" dynamic group does not have to transmit the picture attribute with the request.

Some dynamic group filters may simply filter based on the presence or absence of a certain attribute, not necessarily caring about the value of that attribute. Such filters are called presence filters. In response to request 604, a directory server may respond with the construct of the presence filter.

For example, a presence filter may be "jpeg=*" such that the filter looks at the entry to determine if the entry includes a jpeg image. The contents of the jpeg image are irrelevant to this example presence filter. Presently, and without the benefits of an embodiment of the invention, one would have to transmit the entry with the entire jpeg image just so the filter can determine that the entry includes a jpeg.

By using an illustrative embodiment of the invention, a directory server, if using presence filters, may return the presence filter in response to a request for dynamic group filters. For example, in response to the dynamic group filter request portion of request 716, directory server 704 may respond by returning "jpeg=*" dynamic group filter in response 728. Thus, by using an embodiment of the invention, a request for dynamic group filters would reveal that a presence filter uses the presence or absence of a picture to determine membership. Consequently, a request for dynamic group membership for an entry according to the illustrative embodiments may only indicate, such as by using a binary bit, the presence or absence of a picture in the entry.

The examples of dynamic group filters described here are not intended to be limiting on the illustrative embodiments. Any type of dynamic group filter can be discovered using the illustrative embodiments and the same are contemplated within the scope of the illustrative embodiments. Some more examples of dynamic group filters that may be discovered using the illustrative embodiments are additionally described here for clarity.

As an example, a dynamic group filter may determine membership to a "group eligible for xyz benefit plan" based on the age of the user associated with an entry. In other words, the dynamic group filter may be, for example, "age>65". In accordance with an embodiment of the invention, a request for dynamic group filters may reveal the use of the "age" attribute in the example dynamic group filter. Accordingly, a request for dynamic group membership may include only the age attribute and certain other attributes of an entry, if needed according to a particular configuration, to determine the entry's membership into the "group eligible for xyz benefit plan" dynamic group.

As another example, a dynamic group filter may determine membership to a "xyz technology user group" based on an attribute of an entry of a user that may indicate the user's involvement with the xyz technology. In other words, the dynamic group filter may be, for example, "technology=xyz". For example, the xyz technology may be Linux applications, and a user's entry may include a technology attribute or tag to reflect that the user works in a Linux applications technology group in an organization. In accordance with an embodiment of the invention, a request for dynamic group filters may reveal the use of the "technology" attribute in the example dynamic group filter. Accordingly, a request for dynamic group membership may include only the technology attribute or tag and certain other attributes or tags of an entry, if needed according to a particular configuration of a directory, to determine the entry's membership into the "xyz technology user group" dynamic group.

As another example, a dynamic group filter may determine membership to a "group of Linux OS systems" based on an attribute of an entry of a system that may indicate the system's use of the Linux operating system. In other words, the dynamic group filter may be, for example, "OS=Linux". In a given data processing environment, systems using a variety of operating systems may be added and removed from the data processing environment as needed. Such a dynamic grouping may be used to determine, for example, whether, at a given time, a certain data processing system has to be updated with a patch. In accordance with an embodiment of the invention, a request for dynamic group filters may reveal the use of the "OS" attribute or tag in the example dynamic group filter. Accordingly, a request for dynamic group membership may include only the "OS" attribute or tag, and certain other attributes or tags of an entry if needed according to a particular configuration of a directory, to determine the entry's membership into the "group of Linux OS systems" dynamic group.

Proxy server 708 may receive responses 720, 722, 724, 726, 728, and 730 from directory servers 702, 704, and 706. Proxy server may combine those responses and send response 732 to directory application 710 in response to request 712. In one embodiment, proxy 708 may omit combining the responses received from the directory servers and simply pass on the individual responses to directory application 710.

Separate responses containing static group membership information and dynamic group filters are depicted only as an example embodiment and such an implementation is not intended to be a limitation on the various embodiments of the invention. In one embodiment, a directory server may combine the information pertaining to static group memberships and dynamic group filters in a single response within the scope of the various embodiments of the invention. In another embodiment, some directory servers may send separate static group memberships and dynamic group filters responses, and other directory servers may send combined static group memberships and dynamic group filters responses.

Figure 8:
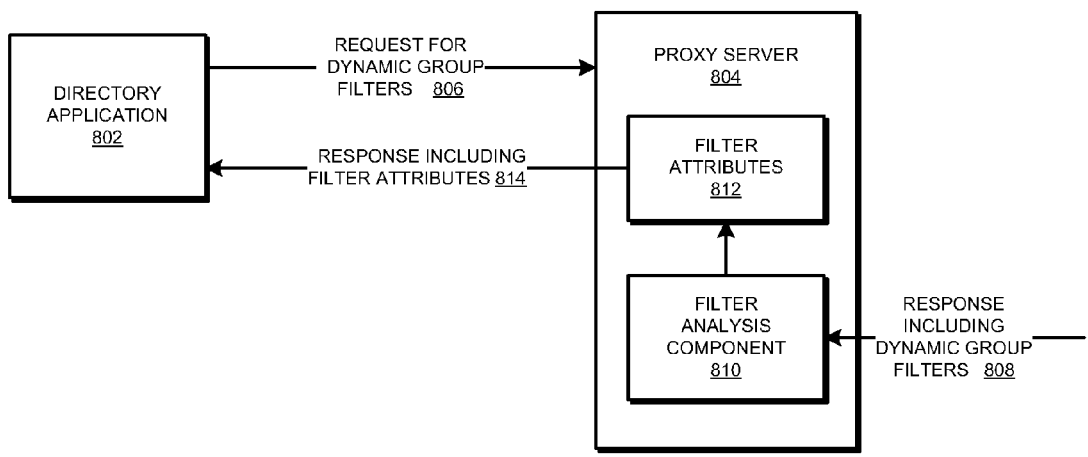
FIG. 8 depicts a block diagram of an example way of dynamic group filters analysis in accordance with an illustrative embodiment.

With reference to FIG. 8, this figure depicts a block diagram of an example way of dynamic group filters analysis in accordance with an illustrative embodiment. Directory application 802 may be similar to directory application 710 in FIG. 7. Proxy server 804 may be implemented using proxy server 708 in FIG. 7.

Directory application 802 may send request 806 for dynamic group filters to proxy server 804. Request 806 may be similar to request 712 in FIG. 7. Proxy server 804 may send a corresponding request to a directory server and receive response 808 including dynamic group filters in use at that directory server.

Filter analysis component 810 may be a component of proxy server 804. Filter analysis component 810 may accept one or more responses, such as response 808, and analyze the dynamic group filters information contained therein. Filter analysis component 810 extracts filter attributes 812 from response 808. Filter attributes 812 may be attributes, tags, or a combination thereof, that a dynamic group filter of response 808 uses from an entry for determining a dynamic group membership of that entry.

Responding to request 806, proxy server 804 sends filter attributes 812 in response 814 to directory application 802. Thus, directory application 802 receives information about which attributes or tags are being used by the various dynamic group filters at the various directory servers in a distributed directory environment. Using this information, directory application 802 can subsequently send a request for dynamic group memberships of an entry and include information about only those attributes or tags in the request.

Figure 9:
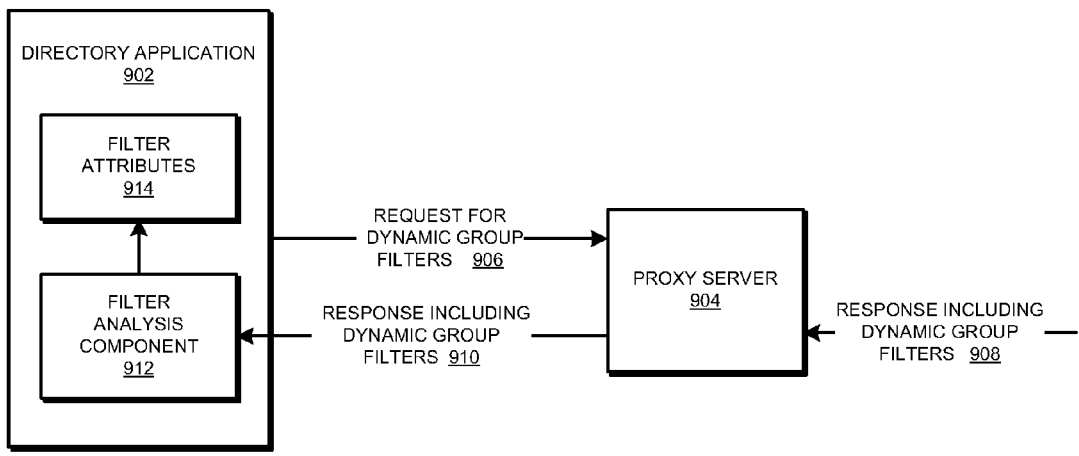
FIG. 9 depicts a block diagram of another example way of dynamic group filters analysis in accordance with an illustrative embodiment.

With reference to FIG. 9, this figure depicts a block diagram of another example way of dynamic group filters analysis in accordance with an illustrative embodiment. Directory application 902 may be similar to directory application 710 in FIG. 7. Proxy server 904 may be implemented using proxy server 708 in FIG. 7.

Directory application 902 may send request 906 for dynamic group filters to proxy server 904. Request 906 may be similar to request 712 in FIG. 7. Proxy server 904 may send a corresponding request to a directory server and receive response 908 including dynamic group filters in use at that directory server.

Proxy server 904 may pass one or more responses, such as response 908, to directory application 902 as response 910. Response 910 may include dynamic group filters information from one or more directory server responses separately, combined, or in some combination of separate and combined responses.

Filter analysis component 912 may be a component of directory application 902. Filter analysis component 912 may accept one or more responses, such as response 910, and analyze the dynamic group filters information contained therein. Filter analysis component 912 extracts filter attributes 914 from response 910. Filter attributes 914 may be attributes, tags, or a combination thereof, that a dynamic group filter of response 910 uses from an entry for determining a dynamic group membership of that entry.

Thus, in another example way, directory application 902 receives information about which attributes or tags are being used by the various dynamic group filters at the various directory servers in a distributed directory environment. Using this information, directory application 902 can subsequently send a request for dynamic group memberships of an entry and include information about only those attributes or tags in the request.

FIGS. 8 and 9 depict two example ways of analyzing the dynamic group filters used by directory servers in a distributed directory environment. Other alternate implementations that distribute the filter analysis component and filter attributes in other data processing systems are within the contemplations of the various embodiments of the invention.

By using an embodiment of the invention, unnecessary attributes are omitted from transmission for evaluating group memberships. Furthermore, where presence filters are used, the various embodiments of the invention can be used to omit the value of even the particular attribute used, such as an image file, and transmit only an indicator of the attribute's presence or absence in a given entry in the request.

Thus, the requests for dynamic group memberships according to the illustrative embodiments are significantly smaller as compared to the presently used requests for dynamic group memberships. The smaller sized requests reduce the data traffic in distributed directory environment, or other distributed data environments where the various embodiments of the invention may be practiced.

Figure 10:
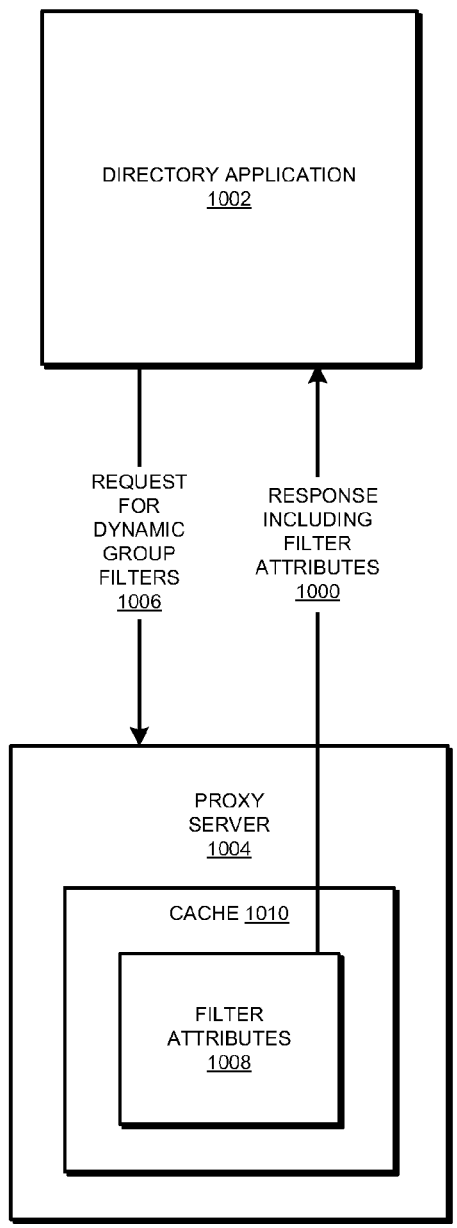
FIG. 10 depicts a block diagram of a modified process of requesting dynamic group filters in accordance with an illustrative embodiment.

With reference to FIG. 10, this figure depicts a block diagram of a modified process of requesting dynamic group filters in accordance with an illustrative embodiment. Directory application 1002 may be implemented using directory application 802 in FIG. 8. Proxy server 1004 may be implemented using proxy server 804 in FIG. 8.

In some cases, the efficiency of requesting dynamic group filters according to the illustrative embodiments can be further improved. For example, when the circumstances of specific implementations permit, the proxy server can decide to omit transmitting such requests onwards to one or more directory servers. As an example, the security policy of a distributed directory implementation may permit the proxy server to cache some information in its data storage or memory for some length of time. The length of time is the caching time period. Caching is a way of saving information. Cache is a type of data storage, typically an area of the memory of a data processing system.

As depicted in FIG. 10, directory application 1002 may send request 1006 for dynamic group filters to proxy server 1004. Proxy server 1004 may determine that the filter attributes extracted from a previous request for dynamic group filters exist as filter attributes 1008 in cache 1010 of proxy server 1004.

Based on this determination, proxy server 1004 may further determine that filter attributes 1008 in cache 1010 are not stale, to wit, are not older than the permitted caching time period. If filter attributes 1008 exist and are not stale, proxy server 1004 may decide to not send a request for dynamic group filters to some directory servers. Proxy server 1004 may respond to request 1006 with response 1012 that may include filter attributes 1008. Operating in this manner, some of the requests for dynamic group filters to some directory servers are not constructed or transmitted at all, resulting in saved computing resources and data bandwidth.

Figure 11:
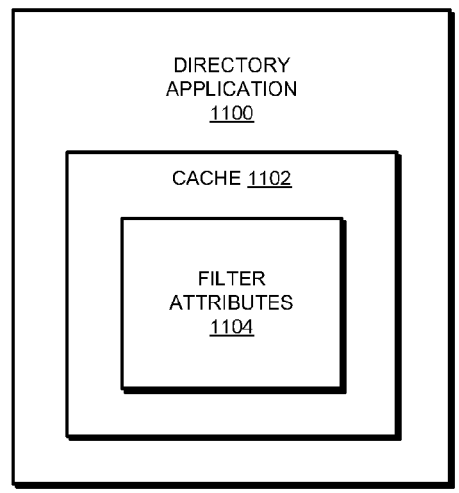
FIG. 11 depicts a block diagram of a modified configuration for receiving dynamic group filters in accordance with an illustrative embodiment.

With reference to FIG. 11, this figure depicts a block diagram of a modified configuration for receiving dynamic group filters in accordance with an illustrative embodiment. Directory application 1100 may be implemented using directory application 902 in FIG. 9.

In some cases, the efficiency of requesting dynamic group filters according to the illustrative embodiments can be further improved. For example, when the circumstances of specific implementations permit, a directory application may reuse the filter attributes received in response to a previous request for dynamic group filters. Consequently, the directory application can decide to omit transmitting another request to the proxy server. As an example, the security policy of a distributed directory implementation may permit the directory application to cache some information in its cache for some caching time period.

As depicted in FIG. 11, directory application 1100 examine cache 1102 associated therewith to find filter attributes 1104. Directory application 1100 may determine that the filter attributes extracted from a previous request for dynamic group filters exist and are not older than the permitted caching time period. If filter attributes 1106 exist and are not stale, directory application 1100 may decide to not send a request for dynamic group filters to the proxy server at all. Operating in this manner, some of the requests for dynamic group filters are not constructed or transmitted at all, resulting in saved computing resources and data bandwidth.

Figure 12:
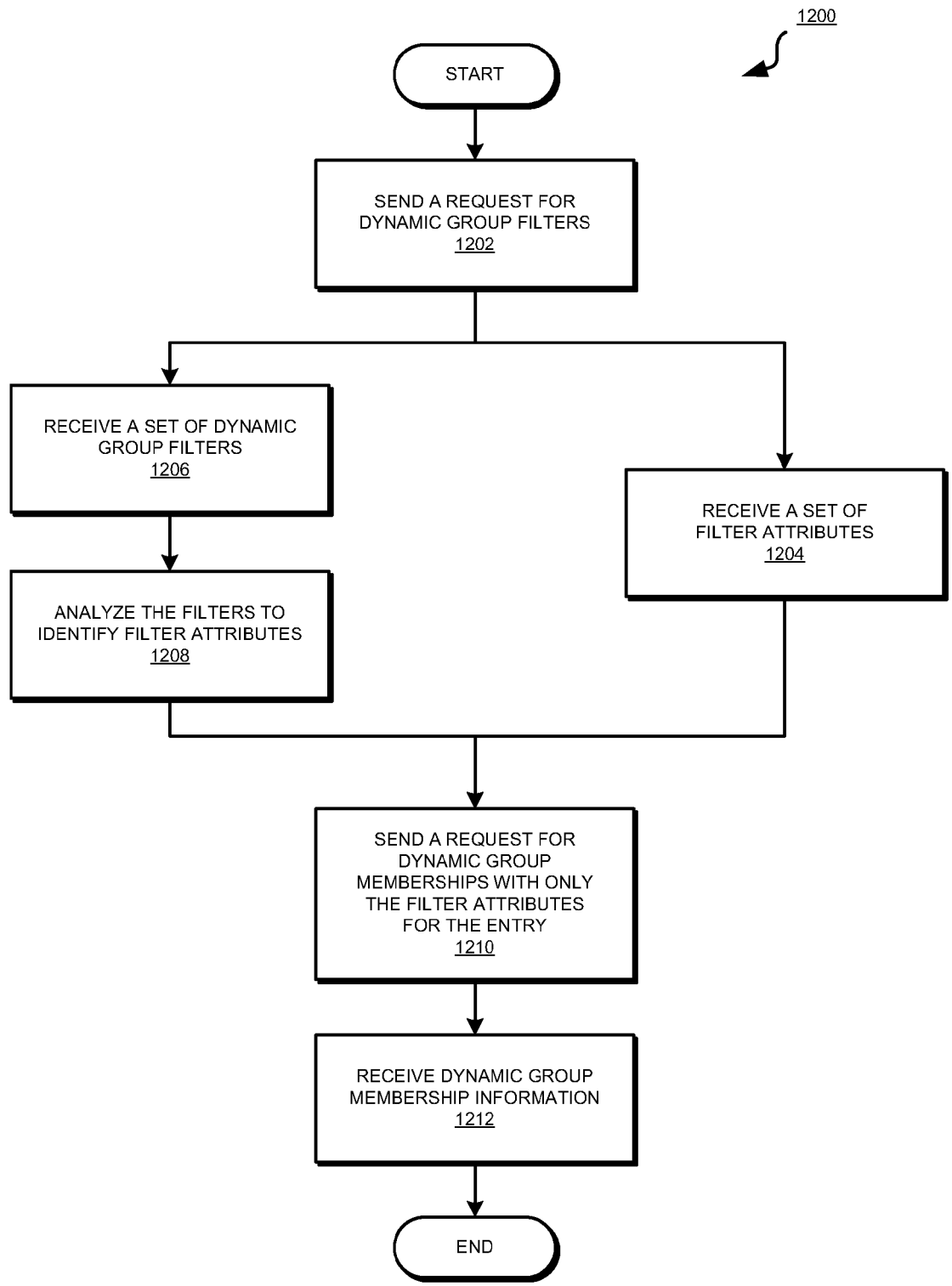
FIG. 12 depicts a flowchart of a process of evaluating distributed group memberships in accordance with an illustrative embodiment.

With reference to FIG. 12, this figure depicts a flowchart of a process of evaluating distributed group memberships in accordance with an illustrative embodiment. Process 1200 may be implemented using a directory server, such as directory server 702 in FIG. 7, or a directory application, such as directory application 710 in FIG. 7.

Process 1200 may include steps (not shown) for sending requests for static group memberships and receiving static group membership information at any point in process 1200. Process 1200 begins by sending a request for dynamic group filters (step 1202). Process 1200 may, in one embodiment, receive a set of filter attributes in response to step 1202 (step 1204). A set of filter attributes is one or more attributes, tags, or a combination thereof.

In another embodiment, process 1200 may receive a set of dynamic group filters in response to step 1202 (step 1206). Having received the dynamic group filters in step 1206, process 1200 analyzes the filters to identify the filter attributes used therein (step 1208). In one embodiment, process 1200 may utilize step 1204 as well as steps 1206-1208 to receive the filter attributes.

Process 1200, having identified the filter attributes in step 1204, step 1208, or both, sends a request for dynamic group memberships of an entry with only the filter attributes for the entry (step 1210). In one embodiment, such as when using presence filters, step 1210 may send the request with information about filter attributes, indicators of presence or absence of some filter attributes, or some combination thereof.

Process 1200 receives the dynamic group membership information for the entry (step 1212). Process 1200 ends thereafter.

Figure 13:
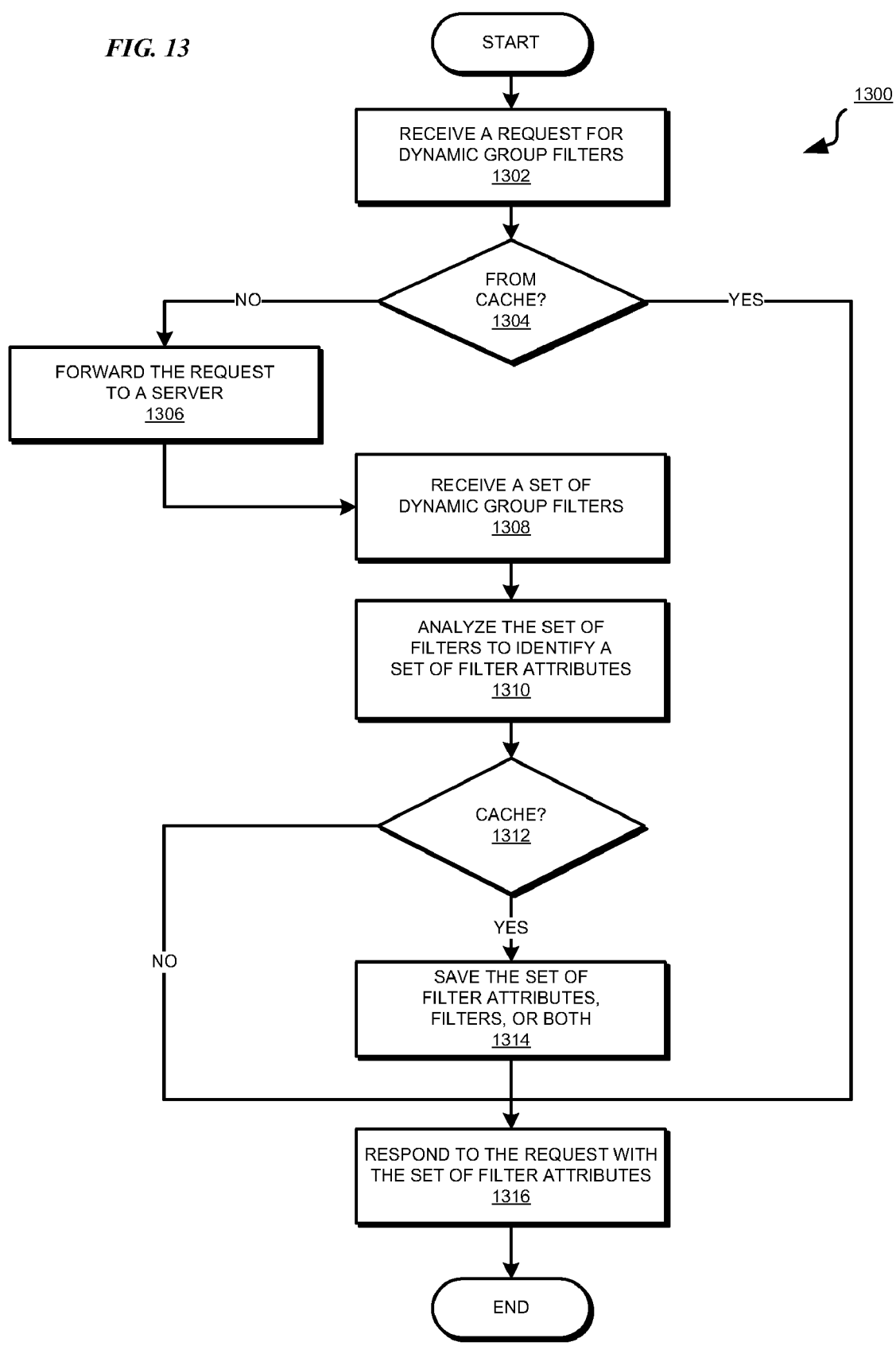
FIG. 13 depicts a flowchart of a process of processing requests for dynamic group filters in accordance with an illustrative embodiment.

With reference to FIG. 13, this figure depicts a flowchart of a process of processing requests for dynamic group filters in accordance with an illustrative embodiment. In one embodiment, process 1300 may be implemented using a proxy server, such as proxy server 1004 in FIG. 10. In another embodiment, portions of process 1300 may be implemented in a directory application, such as directory application 1100 in FIG. 11. In another embodiment, some portions of process 1300 may be implemented in a proxy server and some portions may be implemented in a directory application within the scope of the various embodiments of the invention.

Process 1300 begins by receiving a request for dynamic group filters (step 1302). Process 1300 determines if the request can be satisfied from cached data (step 1304). For example, process 1300 may determine in step 1304 whether cached filter attributes can be provided in a response to the request of step 1302.

If process 1300 determines that the request of step 1302 cannot be satisfied from cache ("No" path of step 1304), process 1300 forwards a version of the request to a server, such as a directory server (step 1306). Process 1300 receives a set of dynamic group filters (step 1308). Process 1300 analyzes the set of filters to identify a set of filter attributes (step 1310).

Process 1300 determines if the filter attributes from step 1310, dynamic group filters from step 1308, or a combination thereof, can be cached (step 1312). If process 1300 determines that some combination of the filter attributes and filters can be cached ("Yes" path of step 1312), process 1300 saves the filter attributes, filters, or both (step 1314). Process 1300 responds to the request of step 1302 with the set of filter attributes (step 1316). Process 1300 ends thereafter. In one embodiment, process 1300 may respond with a combination of the filter attributes and the filters in step 1316.

If process 1300 determines that the filter attributes or the filters cannot be cached ("No" path of step 1312), process 1300 proceeds to step 1316. Returning to step 1304, if process 1300 determines that the request of step 1302 can be satisfied from cache ("Yes" path of step 1304), process 1300 proceeds to step 1316 and responds with a cached combination of filter attributes and filters. For example, in one embodiment, process 1300 may return cached filter attributes in step 1316. In another embodiment, process 1300 may return cached filters in step 1316. In another embodiment, process 1300 may return some cached filter attributes and some cached filters in step 1316.

The components in the block diagrams and the steps in the flowcharts described above are described only as examples. The components and the steps have been selected for the clarity of the description and are not limiting on the various embodiments of the invention. For example, a particular implementation may combine, omit, further subdivide, modify, augment, reduce, or implement alternatively, any of the components or steps without departing from the scope of the various embodiments of the invention. Furthermore, the steps of the processes described above may be performed in a different order within the scope of the various embodiments of the invention.

Thus, a computer implemented method, apparatus, and computer program product are provided in the illustrative embodiments for transmitting information about distributed group memberships. Information, such as membership information, may be communicated by sending, receiving, requesting, or otherwise transmitting the information. Evaluation of membership may be performed before, after, or during the communication of the membership information.

By implementing the illustrative embodiments, a distributed data environment may be able to reduce the data traffic associated with evaluating dynamic group memberships for data objects. The illustrative embodiments can be implemented in any distributed data environment and are not limited to distributed directories.

The illustrative embodiments first inquire which attributes participate in dynamic group filters in the distributed data environment. The illustrative embodiments select to transmit only those attributes or indicators of presence or absence of those attributes for determining the data object's dynamic group memberships. The amount of data associated with attributes of the data object can be significantly reduced because attributes that do not participate in any filters are not transmitted in the illustrative embodiments.

The illustrative embodiments can further reduce the data traffic associated with evaluating group memberships by using cached data. In one instance, the evaluator of group memberships sends the requests for filters but a proxy determines whether to request the filters from data servers or respond with cached filter information. In another instance, the evaluator may itself determine that cached filter information exists and decide to omit requesting the dynamic group filters.

The invention can take the form of an entirely software embodiment, or an embodiment containing both hardware and software elements. In a preferred embodiment, the invention is implemented in software using program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for transmitting information about distributed group memberships of an entry stored in a computer memory, the computer implemented method comprising:
   receiving a set of dynamic group filters from a server in a distributed data environment, the set of dynamic group filters providing a set of attributes;
   determining whether the entry includes a subset of the set of attributes;
   identifying an attribute of the entry that is not used by any of the dynamic group filters in the set of dynamic group filters, forming an identified attribute;
   including the subset of attributes and excluding the identified attribute in a request for dynamic group memberships of the entry, the excluding resulting in shrinking a size of the request without preventing the entry from membership in a dynamic group, wherein the request for dynamic group memberships includes for an attribute in the subset of attributes an indication of presence of the attribute, the including being according to a manner of use of the attribute in a dynamic group filter in the set of dynamic group filters;
   sending the request for dynamic group memberships of the entry to the server; and
   receiving information about at least one dynamic group of which the entry is a member.

2. The computer implemented method of claim 1, wherein the receiving the set of dynamic group filters is receiving from a cache, wherein the cache is accessible from a data processing system performing the receiving, and wherein the receiving from the cache prevents a request for dynamic group filters from being transmitted from the data processing system.

3. The computer implemented method of claim 1, further comprising:
   requesting the set of dynamic group filters from the server, wherein the server is a proxy server.

4. The computer implemented method of claim 1, wherein providing a set of attributes further comprises:
   analyzing each dynamic group filter in the set of dynamic group filters, the analyzing identifying in each dynamic group filter an attribute that the dynamic group filter uses to determine membership in a dynamic group, the analyzing resulting in identification of the set of attributes.

5. The computer implemented method of claim 1, further comprising:
   sending a request for static group memberships of the entry; and
   receiving information about at least one static group of which the entry is a member, for evaluation.

6. The computer implemented method of claim 1, wherein receiving the set of dynamic group filters is receiving the set of attributes, and wherein identifying the attribute not used by any of the dynamic group filters in the set of dynamic group filters is identifying the attribute that is not a member of the set of attributes.

7. A computer implemented method for transmitting information about distributed group memberships of an entry stored in a computer memory, the computer implemented method comprising:
   receiving from a sender, a first request for a set of dynamic group filters;
   sending a second request for a subset of the set of dynamic group filters to a server in a distributed data environment;
   receiving the set of dynamic group filters;
   sending the set of dynamic group filters to the sender;
   receiving a third request for dynamic group memberships of the entry, the third request including information about a subset of the set of attributes, the third request further excluding another attribute of the entry not used by any of the dynamic group filters in the set of dynamic group filters, the excluding shrinking a size of the third request without preventing the entry from membership in a dynamic group, wherein the third request for dynamic group memberships includes for an attribute in the subset of attributes an indication of presence of the attribute, the including being according to a manner of use of the attribute in a dynamic group filter in the set of dynamic group filters; and
   providing at least one dynamic group of which the entry is a member.

8. The computer implemented method of claim 7, further comprising:
   determining whether the first request can be satisfied from a cache associated with a data processing system receiving the request; and
   sending to the sender, responsive to the determining being true, the set of dynamic group filters from the cache, wherein the sending prevents the second request from being sent.

9. The computer implemented method of claim 7, further comprising:
   analyzing the set of dynamic group filters, the analyzing resulting in a set of attributes;
   determining whether to cache a subset of the set of attributes; and
   caching, responsive to the determining being true, the subset of the set of attributes.

10. The computer implemented method of claim 9, wherein the first request is a request for the set of attributes, the computer implemented method further comprising:
    determining whether the first request can be satisfied from a cache associated with a data processing system receiving the request; and
    sending to the sender, responsive to the determining being true, the subset of attributes from the cache, wherein the sending prevents the second request from being sent.

11. A computer usable program product comprising a computer usable storage device including computer usable code for transmitting information about distributed group memberships of an entry stored in a computer memory, the computer usable code comprising:

computer usable code for receiving a set of dynamic group filters from a server in a distributed data environment, the set of dynamic group filters providing a set of attributes;

computer usable code for determining whether the entry includes a subset of the set of attributes;

computer usable code for identifying an attribute of the entry that is not used by any of the dynamic group filters in the set of dynamic group filters, forming an identified attribute;

computer usable code for including the subset of attributes and excluding the identified attribute in a request for dynamic group memberships of the entry, the excluding resulting in shrinking a size of the request without preventing the entry from membership in a dynamic group, wherein the request for dynamic group memberships includes for an attribute in the subset of attributes an indication of presence of the attribute, the including being according to a manner of use of the attribute in a dynamic group filter in the set of dynamic group filters;

computer usable code for sending the request for dynamic group memberships of the entry to the server; and computer usable code for receiving information about at least one dynamic group of which the entry is a member.

12. The computer usable program product of claim 11, wherein providing a set of attributes further comprises:

computer usable code for analyzing each dynamic group filter in the set of dynamic group filters, the analyzing identifying in each dynamic group filter an attribute that the dynamic group filter uses to determine membership in a dynamic group, the analyzing resulting in identification of the set of attributes.

13. The computer usable program product of claim 11, wherein receiving the set of dynamic group filters is receiving the set of attributes, and wherein identifying the attribute not used by any of the dynamic group filters in the set of dynamic group filters is identifying the attribute that is not a member of the set of attributes.

14. The computer program product of claim 11, wherein the computer usable code is stored in a computer readable storage medium in a data processing system, and wherein the computer usable code is transferred over a network from a remote data processing system.

15. The computer program product of claim 11, wherein the computer usable code is stored in a computer readable storage medium in a server data processing system, and wherein the computer usable code is downloaded over a network to a remote data processing system for use in a computer readable storage medium associated with the remote data processing system.

16. A data processing system for transmitting information about distributed group memberships of an entry stored in a computer memory, the data processing system comprising:

a storage device including a storage medium, wherein the storage device stores computer usable program code; and a processor, wherein the processor executes the computer usable program code, and wherein the computer usable program code comprises:

computer usable code for receiving from a sender, a first request for a set of dynamic group filters;

computer usable code for sending a second request for a subset of the set of dynamic group filters to a server in a distributed data environment;

computer usable code for receiving the set of dynamic group filters;

computer usable code for sending the set of dynamic group filters to the sender;

computer usable code for receiving a third request for dynamic group memberships of the entry, the third request including information about a subset of the set of attributes, the third request further excluding another attribute of the entry not used by any of the dynamic group filters in the set of dynamic group filters, the excluding shrinking a size of the third request without preventing the entry from membership in a dynamic group, wherein the third request for dynamic group memberships includes for an attribute in the subset of attributes an indication of presence of the attribute, the including being according to a manner of use of the attribute in a dynamic group filter in the set of dynamic group filters; and computer usable code for providing at least one dynamic group of which the entry is a member.

17. The data processing system of claim 16, further comprising:

computer usable code for determining whether the first request can be satisfied from a cache associated with a data processing system receiving the request; and computer usable code for sending to the sender, responsive to the determining being true, the set of dynamic group filters from the cache, wherein the sending prevents the second request from being sent.

18. The data processing system of claim 16, further comprising:

computer usable code for analyzing the set of dynamic group filters, the analyzing resulting in a set of attributes;

computer usable code for determining whether to cache a subset of the set of attributes;

computer usable code for caching, responsive to the determining being true, the subset of the set of attributes;

computer usable code for determining whether the first request can be satisfied from a cache associated with a data processing system receiving the request; and computer usable code for sending to the sender, responsive to the determining being true, the subset of attributes from the cache, wherein the sending prevents the second request from being sent.

* * * * *